March 3, 1964     J. A. CORSETTI     3,123,394
AUTOMOBILE WINDSHIELD RAIN VISOR
Filed Oct. 9, 1961
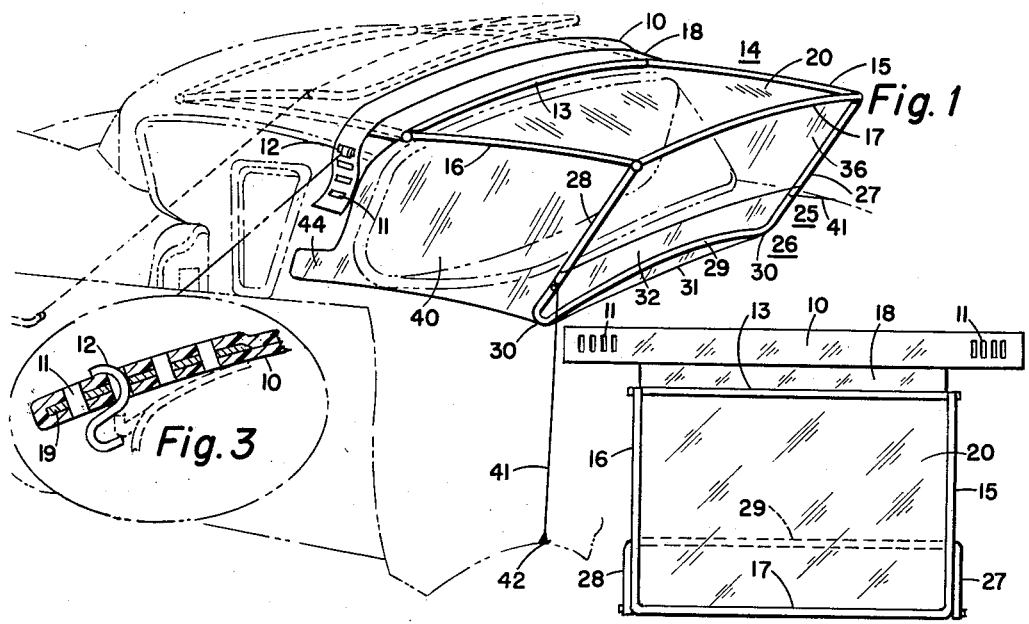
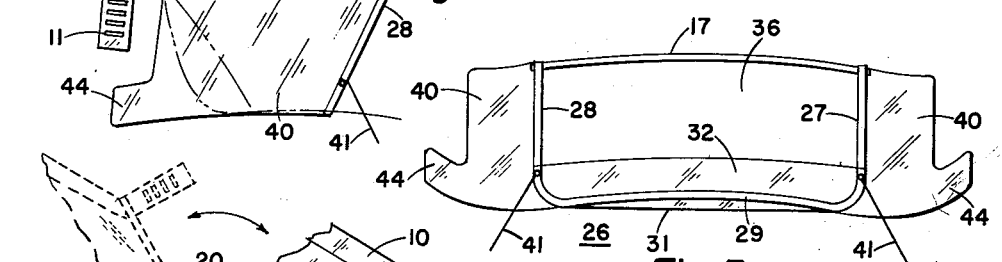
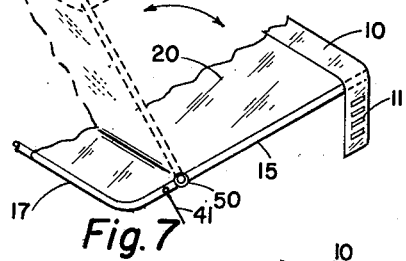
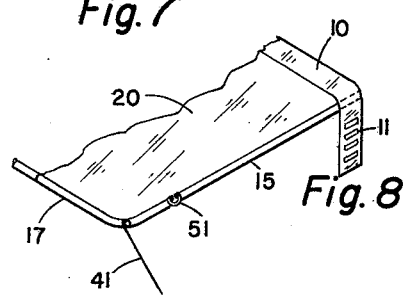
INVENTOR.
JOHN A. CORSETTI
BY
ATTORNEY

United States Patent Office

3,123,394
Patented Mar. 3, 1964

3,123,394
AUTOMOBILE WINDSHIELD RAIN VISOR
John A. Corsetti, Greece, N.Y., assignor to Kover-Kar Incorporated, Rochester, N.Y., a corporation of New York
Filed Oct. 9, 1961, Ser. No. 143,649
6 Claims. (Cl. 296—95)

This invention relatese to a rain hood or visor for shielding the windshield of an automobile. More particularly, the invention relates to a windshield enclosure or covering adapted for detachable mounting about an automobile windshield without obscuring windshield visibility of the automobile occupants. Such an apparatus has many uses, being particularly useful as a rain or snow protector in the drive-in type motion picture theatre.

The motion picture industry has generally faltered in recent years with the advent and growth of television which became a strong video competitor to a previously dominant industry. One segment of the motion picture industry which continued to grow despite competition from other sources has been the drive-in type theatre. This type of theatre has become increasingly widespread in recent years and generally comprises an open-air theatre whereat patrons can enjoy motion picture entertainment, as the name implies, from the confinement and comfort of their own automobile or car. Each car is parked facing the screen in a separate stall or booth of which many are uniformly arranged in rows extending approximately transversely and within convenient viewing distance of the theatre screen. Each stall contains a separate "speaker" which is utilized by occupants in the attendant car for receiving the audio portion of the "picture" and viewing of the picture is effected through the windshield of the automobile. The popularity of this type of threatre has increased tremendously as more and more families have come to realize and utilize the drive-in threatre as a combination of motion picture entertainment and family outing. It is not uncommon to experience a large number of cars in attendance containing complete family units, including four or more children.

The sustenance of the drive-in theatre business is to a large degree the weather. When the weather is nice it is psychologically conducive to large patronage and consequently good business. Inclement weather, however, such as rain or snow, has heretofore been a major deterent to attendance and extremely costly to the proprietor of the theatre. The weather has been known to "make or break" a drive-in theatre. For example, for the year 1958, the U.S. Weather Bureau meterological record for the city of Rochester, New York, reported 228 days having a measurable rain or snowfall. The frequency varied from 12 to 29 days per month. In order to view the theatre screen during even the mildest of drizzles, it has been necessary heretofore to operate windshield wipers in order to remove the obscuring effect caused by the falling rain. On many automobiles, in order to obtain the benefit of the windshield wipers, the engine must be continually operative.

The use of windshield wipers for this purpose has been found extremely annoying in that they reduce but do not eliminate the obscurity of vision while constituting a sound eflect inconsistent with the sound track of the movie. Because of these annoyances, which without the movie could not even be seen, attendance during inclement weather has been substantially reduced, cutting severely into the proprietor's profits. Not only does the proprietor lose by the actual falling of rain, but even the mere threat of rain markedly discourages attendance. In addition, those admitted in attendance prior to a rainfall have been found to leave the theatre as rain commences. This last situation necessitates that the proprietor refund the admission price in order to retain the good will of his clientele.

Now in accordance with the instant invention there is provided a windshield rain protector that may conveniently be stored on the premises of a drive-in theatre and which may be attached to any conventional make of automobile in a matter of seconds. By means of the apparatus of the invention, patrons can now observe the movie at a drive-in theatre during inclement weather without obscurity of vision caused by rain or snow falling on the widshield and without the annoyances associated with windshield wipers, as had previously been experienced. The advantages of the invention are many, not the least of which is the increased attendance resulting in increased profits to the proprietor of the theatre. The windshield protectors of the invention accord a light weight apparatus easily and securely attachable to any conventional size or make of automobile, including the collapsible type "convertible" roof, without marring, scratching or otherwise adversely affecting the automobile or its finish, such that the apparatus of the invention fulfills a long felt need and a long awaited want. Speed of installation and removal is an essential feature of the invention.

Accordingly it is an object of the invention to provide an attachment for automobiles to protect the windshield against the elements of falling rain or snow.

It is a further object of the invention to provide a windshield protector for automobiles of the type aforesaid that may be conveniently stored and is easily and simply attached and detached from an automobile in a short time duration.

It is a further object of the invention to provide a windshield protector apparatus of the type aforesaid for attachment to an automobile without obscuring windshield visibility.

It is a further object of the invention to provide a windshield protector of the type aforesaid for attachment to an automobile that is easily manageable and can be collapsibly withdrawn to an unobstrusive position.

These and other objects are attained by the apparatus of the invention as will be understood by the description to follow as relating to the following drawings:

FIG. 1 perspectively illustrates one embodiment of the invention shown in its attached position on an automobile;
FIG. 2 is a top view of the embodiment of FIG. 1;
FIG. 3 is a fragmentary enlarged view illustrating a method of attaching the apparatus to an automobile roof;
FIG. 4 is a side view of the embodiment of FIG. 1;
FIG. 5 is a front view of the embodiment of FIG. 1;
FIG. 6 is a perspective view of a second embodiment of the invention;
FIG. 7 is a variation of the embodiment of FIG. 6; and
FIG. 8 is a second variation of the embodiment of FIG. 6.

As illustrated in the drawings, the apparatus of the invention is comprised of several joined sections of substantially mar-proof, durable and water-impermeable material. The apparatus is arranged to extend generally horizontally and forward towards the front of the car from a position on the roof behind the windshield molding, to partially over the hood portion of the automobile. Preferably, although not necessarily, the material employed for some or all of the sections may be partly or entirely substantially transparent. With transparent materials' an automobile on which the apparatus is attached in its protective position may be driven, for example, from the admission entrance of the theatre to a stall of the patron's choice, or from one stall to another more conveniently located relative to the screen. A material found suitable for this purpose is a commercially marketed tough vinyl plastic, commonly used as a transparent type automobile seat cover.

Referring now more particularly to FIGS. 1–5, the apparatus of the invention is shown supported in its protective position on an automobile configuratively outlined for orientation and understanding of the relationship of the apparatus supported thereon. The apparatus consists of an elongated strap portion 10 adapted for strapping to the roof of the automobile above and behind the upper windshield molding. Each end of the strap contains several uniformly spaced slots 11 to receive an S-hook or the like 12, which may be nylon or other relatively scratch proof or marproof material for attaching the strap to a conveniently susceptible location on the car. One such convenient location is the eaves trough extending lengthwise along the roof on all conventional makes of cars. On "convertibles" the hook can be secured to the frame of the top mechanism. Preferably the strap has at least a minor degree of elasticity enabling it to be drawn tight against the roof. Because of the tension applied on the strap 10 in attaching the apparatus, the strap in the illustrated embodiment is of double thickness with an intermediate reinforcing 19. By means of the several spaced slots the effective length of the strap can be accommodated to any width of car by inserting the hooks into appropriate slots on opposite ends most nearly corresponding to the width of the car on which the apparatus is to be installed.

Attached to strap 10 is a center strip 18 that is substantially form fitting to the roof contour. When in installed position therefore, strip 18 prevents roof runoff from overflowing onto the windshield.

Encased along one edge of the strip 18 and resting on the roof is a rear support member 13 comprising one section of a support frame 14 that includes also side members 15 and 16 and a front member 17. The entire frame may consist of light weight stock such as 3/16" metal rod, tubing, or the like to afford reasonable rigidity but light weight. In the embodiment shown the side members 15 and 16 are conveniently joined to the front member as by welding, bolting or other conventionally known means. The side members are pivotally secured by means of an eye to the rear supporting member in order that the apparatus can be withdrawn and collapsed to a position shown dashed in FIG. 1.

Attached tautly around the frame 14 is the protector visor section 20 secured to bar 13 from behind the rearmost extremity of the windshield to substantially beyond the forwardmost portion of the windshield. This will be understood when considering that most conventional windshields are inclined forwardly down from roof to hood. In width the visor extends substantially coterminous with the width of the windshield. A slight upward rise in the frame toward the front has been found helpful to increase the area of vision in looking toward the screen. Also a bow in the width peaking approximately in the center assists water runoff toward the sides.

Extending downward and pivotally connected to the frame member 14 is a vertical frame section 25 extending downward onto the hood of the automobile. This latter frame provides additional support for the first frame and also provides support for a splash guard 26 as will be described.

In the embodiment illustrated, the vertical frame includes two side bars 27 and 28 supported rearwardly inclined and connected to an upward bowed lower bar 29. The lower bar 29 contains two knee sections 30 adapted to rest on the hood and between which the bar is bowed upward to ensure fitting over any curvature of hood.

The splash guard 26 is positioned to prevent splashing or deflecting onto the windshield from rain or snow falling onto the hood. The splash guard includes a lower loosely hanging section 31 below the bar to close off the opening between the bar and hood and an upper section 32, extending across the lower part of the windshield and partially up from the hood a matter of about 5–6 inches. Between the upper edge of the splash guard and visor 20 there is defined an opening 36, encompassing the line of vision from the automobile to the screen. By means of the splash guard, rain falling beyond the forward extremities of the visor, but which nonetheless by virtue of its angle of fall would otherwise be deflected from the hood, is intercepted before reaching the windshield. It will be noted that the splash guard is positioned vertically behind the front extremity of the top visor for which frame member 25 is inclined rearwardly downward. By this means windshield splashing is substantially prevented.

Supported loosely on each side of the apparatus is a side curtain 40 to prevent side rain or windblown rain from reaching the windshield. Each side curtain is secured on the top and vertical frames and extends to behind the rear side edges of the windshield. By being of flexible material, the side curtains are able to fit any curvature of windshield. Also, by not being secured along the bottom and rear, they can be conveniently drawn aside to permit access to the windshield for cleaning. A tail section 44 may optionally be included to be caught against the door jamb as the door is closed for securing the side curtain.

Attached from above the corners on each side of frame 25 are elastic cords 41, each having a hook, 42 tied thereto and attachable to a side molding or open wheel-cavity of the front fenders. By this means there is provided added rigidity to sufficiently withstand vibration during the driving of the automobile, or other forces such as wind, as might be associated with inclement weather. Illustrated in dashed outline in FIG. 1 the apparatus is shown collapsed. In this position, hook 42 may conveniently be attached to the door handle or some other accessible location. In this last position, or in any position, the doors are not prevented from being opened. All hooks may be tied to prevent their loss.

Referring now to FIG. 6, another embodiment of the invention is illustrated in which the front frame, center strip, and splash guard have been omitted. This embodiment affords substantial protection from vertical fall without the further refinements illustrated and associated with the first described embodiment. Top bar 13 may optionally be omitted. An intermediate bar (not shown) may be utilized to provide added cantilevered support.

Also cords 41 and hooks 42 may optionally be included as shown for better securement against the effects of high wind pressures. A splash guard 45 may be incorporated, secured to the cords as shown.

When not required, the apparatus can be folded back and secured in position by means of an eye 46 mounted on the visor, which when in folded position is received by a spring clasp 47 mounted on the strap.

FIGS. 7 and 8 each constitute further variations of the embodiment of FIG. 6. Thus the side member 15 of FIG. 7 includes a swing-joint 50 permitting folding and collapsing the apparatus to the arrangement shown dashed. This effects a reduced dimension for convenience of storage and handling.

In FIG. 8 slide member 15 includes a leaf spring or the like 51 to permit drawing the forward edge of visor 20 downward. This enables offsetting too steep a visor rise on an automobile having a steeply sloping roof.

The apparatus of the invention above described affords a simple, convenient and inexpensive means for obtaining windshield rain or snow protection at a minimum of cost. The apparatus is extremely light weight, being on the order of six pounds or less, such that one man can install or attach the apparatus on an automobile in approximately 10 seconds or less. It is constructed preferably of completely rustproof materials to enjoy extended life in the face of the elements, while being completely mar-proof or scratch-proof where contacting or resting on the automobile. It is flexible for adaptation without regard to the make or model of the automobile and offers the distinct advantage of unobscured windshield visibility without the attending annoyances experienced heretofore. Preferably the materials are of a composition that can easily be repaired or replaced at a minimum of expense. The material should not severely be affected by temperature changes or the like such as to generally retain its physical properties under a wide range of ordinary ambient conditions. The various sections may be joined and wrapped about the frame sections and then secured by sewing machine stitching, cementing, or the like. The gauge of material for the various sections varies depending on the choice of material and its inherent properties. For the described material, 16 gauge was found to be generally suitable for the visor, while 12 gauge was utilized for the side curtains and for the strap ends 40 gauge was employed.

For the purpose of this specification "rain" and "snow" are considered to be synonomous.

Since many changes could be made in the above construction and many apparently widely different embodiments of this invention could be made without departing from the scope thereof, it is intended that all matter contained in the drawings and specifications shall be interpreted as illustrative and not in a limiting sense.

I claim:

1. Apparatus attachable to an automobile comprising the combination of a visor section adapted to be supported generally over the horizontal projection of an automobile windshield, said visor section comprising a frame on which is secured a substantially water-impermeable material, means to mount one end of said visor section in substantially water-tight engagement with the roof of an automobile, said last recited means including strap-like means connected to said visor section and arranged when on an automobile to extend in the proximity of the side perimeters of the automobile roof, means for securing said strap-like means to a convenient location on the automobile body, said means for securing said strap-like means being adaptable for the securement thereof onto automobile bodies of different width, and a splash guard section adapted to be supported in a substantially upright position extending upward from a position on the automobile hood for a distance less than the windshield height and width-wise of the hood of said automobile below and approximately coextensive with said visor section, whereby the top of said splash guard section together with said visor section define an opening which lies generally in a line of vision extending out from behind the windshield to beyond the front extremities of the automobile, said splash guard section being substantially effective to intercept falling precipitation being deflected from the hood toward the windshield of the automobile on which said apparatus is attached.

2. An automobile attachment comprising the combination of a visor section adapted to be supported generally over the horizontal projection of an automobile windshield, said visor section being generally planar and formed predominantly of water-impermeable material, means to mount one end of said visor section in substantially water-tight engagement with the roof of an automobile, said last recited means including at least two oppositely arranged strap-like means having means thereon adaptable to secure said strap-like means to automobiles of different width, and a splash guard section adapted to be supported in a substantially upright position extending upward from a position on the automobile hood for a distance less than the windshield height and width-wise of the hood of said automobile below and approximately co-extensive with said visor section whereby the top of said splash guard section together with said visor section define an opening which lies generally in a line of vision extending out from behind the windshield to beyond the front extremities of the automobile, said splash guard section being substantially effective to intercept falling precipitation being deflected from the hood toward the windshield of the automobile on which said apparatus is attached.

3. Apparatus attachable to an automobile comprising the combination of a visor section adapted to be supported generally over the horizontal projection of an automobile windshield, said visor section comprising a frame on which is secured a substantially water-impermeable material, means to mount one end of the visor section in substantially water-tight engagement with the roof of said automobile, said last recited means including a flexible strap-like member secured rearward of the visor section to extend transversely overlying the roof of said automobile for at least substantially the width thereof, a plurality of uniformly spaced openings contained in opposite end portions of said member, and hooks mountable in selective of said openings and securable to a body portion of the automobile, said selective openings being spaced apart a distance approximately equal to the width of automobile on which said apparatus is to be attached, and a splash guard section adapted to be supported extending upward from a position on the hood of the automobile a distance less than the windshield height and widthwise of the hood of said automobile below and approximately coextensive with said visor section, whereby the top of said splash guard section together with said visor section define an opening which lies generally in a line of vision extending out from behind the windshield to beyond the front extremities of the automobile, said splash guard section being substantially effective to intercept falling precipitation being deflected from the hood toward the windshield of the automobile.

4. The apparatus of claim 1 including means to withdraw said visor and splash guard sections to a storage position behind the horizontal projection of the automobile windshield.

5. The apparatus of claim 1 including side panels supported vertically on each side of the visor and adapted to intercept precipitation falling toward the windshield from the side thereof.

6. The apparatus of claim 3 including side panels supported vertically on each side of the visor and adapted to intercept precipitation falling toward the windshield from the side thereof.

References Cited in the file of this patent

UNITED STATES PATENTS

| | | |
|---|---|---|
| 1,462,127 | Sanders | July 17, 1923 |
| 1,675,909 | Riker | July 3, 1928 |
| 1,930,002 | Cunningham | Oct. 30, 1933 |
| 2,409,946 | MacLeod | Oct. 22, 1946 |
| 2,853,129 | Leavitt et al. | Sept. 23, 1958 |